(12) United States Patent
Gupta et al.

(10) Patent No.: US 12,709,166 B2
(45) Date of Patent: Aug. 18, 2026

(54) DAISY-CHAIN DC AUTOMOTIVE POWER MODULE CONNECTIONS

(71) Applicant: FORD GLOBAL TECHNOLOGIES, LLC, Dearborn, MI (US)

(72) Inventors: Man Prakash Gupta, Dearborn, MI (US); Kewei Xiao, Canton, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 18/745,281

(22) Filed: Jun. 17, 2024

(65) Prior Publication Data

US 2025/0381854 A1 Dec. 18, 2025

(51) Int. Cl.

| | |
|---|---|
| ***H01M 10/36*** | (2010.01) |
| ***B60L 50/40*** | (2019.01) |
| ***B60L 50/51*** | (2019.01) |
| ***B60L 50/60*** | (2019.01) |

(52) U.S. Cl.

CPC ............... *B60L 50/40* (2019.02); *B60L 50/51* (2019.02); *B60L 50/60* (2019.02); *B60L 2210/40* (2013.01)

(58) Field of Classification Search

CPC ....................................................... B60L 50/40

See application file for complete search history.

(56) References Cited

U.S. PATENT DOCUMENTS 6,479,964 B2 * 11/2002 Woodroffe .............. F02B 63/04 310/36
6,746,797 B2 * 6/2004 Benson ............... H01M 50/548 429/7
6,844,109 B2 * 1/2005 Xing ................. H01M 10/0565 429/129
9,164,560 B2 10/2015 Templeton et al.
10,447,172 B2 10/2019 Hayashi et al.
12,358,481 B2 * 7/2025 Wu ......................... B60T 13/74
2002/0196609 A1 * 12/2002 Golightly ........... H05K 7/14329 361/736
2008/0131764 A1 * 6/2008 Saiki .................. H01M 50/227 429/149
2019/0333701 A1 * 10/2019 Song ..................... H02M 7/003
2019/0333702 A1 * 10/2019 Song ...................... H01G 11/76
2022/0314837 A1 * 10/2022 Gupta ..................... B60L 58/26
2023/0014935 A1 * 1/2023 Park ..................... H05K 1/0268

FOREIGN PATENT DOCUMENTS

CN 103425098 B 7/2018
JP 5592236 B2 9/2014

* cited by examiner

*Primary Examiner* — Menatoallah Youssef
*Assistant Examiner* — Esayas G Yeshaw
(74) *Attorney, Agent, or Firm* — David B. Kelley; Brooks Kushman P.C.

(57) ABSTRACT

An automotive power module includes a plurality of power card assemblies arranged in a stack. Each of the power card assemblies includes a power card, a phase lead tab extending from the power card, and pairs of power lead tabs extending from the power card and being in direct contact with at least some of the phase lead tabs of adjacent ones of the power card assemblies without use of a bus bar.

20 Claims, 6 Drawing Sheets

210
220
256
220
224
250
220
222
258
222
220
224
228
226
222

226
238
252
248
214
212
226
212
212
220
214
224
210
212
222
242
224
220
244
240

254
222
238
226
226
226
240

454
414
418
456
412
440
424
426
420
422
438
410
416

520
524
510
520
522
524
512
512
522
538
526
526

540
542
520
512
510
520
524
522
522
544
538
526
526

DAISY-CHAIN DC AUTOMOTIVE POWER MODULE CONNECTIONS

TECHNICAL FIELD

This disclosure relates to automotive power electronics systems.

BACKGROUND

Hybrid electric vehicles (HEVs) and electric vehicles (EVs) leverage traction batteries, electric motors, and power electronics systems. HEVs combine an internal combustion engine (ICE) with an electric propulsion system, allowing for various modes of operation such as all-electric, hybrid, and regenerative braking. EVs, on the other hand, rely solely on electric propulsion, powered by large traction batteries. These traction batteries, typically lithium-ion, store electrical energy and supply it to the electric motor. The motor converts this electrical energy into mechanical energy, driving the vehicle's wheels. The electric propulsion system in both HEVs and EVs is managed by a power electronics system, which controls the flow of electrical energy between the battery, motor, and other electronic components.

The power electronics system in HEVs and EVs includes components such as power modules, DC-link capacitors, inverters, and control units. Power modules convert DC power from the battery into AC power to drive the motor. DC-link capacitors stabilize the DC voltage and filter out ripples caused by switching actions within the inverter. The inverter converts DC power from the battery into the three-phase AC power required by the motor. Control units manage the operation of these components.

SUMMARY

An automotive power electronics system has a plurality of capacitor modules each including a capacitive roll and lead tabs in contact with the capacitive roll that define contact platforms on at least one face of the capacitor module. The automotive power electronics system also has a plurality of power card assemblies interleaved with the capacitor modules. Each of the power card assemblies includes a power card, a phase lead tab extending from the power card, and pairs of power lead tabs extending from the power card and being bent such that each of the power lead tabs is in direct contact with one of the contact platforms and one of the power lead tabs of another of the power card assemblies.

An automotive power module has a plurality of power card assemblies arranged in a stack. Each of the power card assemblies includes a power card, a phase lead tab extending from the power card, and at least one pair of power lead tabs extending from the power card and being bent such that one of the power lead tabs is in direct contact with one of the power lead tabs of another of the power card assemblies.

An automotive power module has a plurality of power card assemblies arranged in a stack. Each of the power card assemblies includes a power card, a phase lead tab extending from the power card, and pairs of power lead tabs extending from the power card and being in direct contact with at least some of the phase lead tabs of adjacent ones of the power card assemblies without use of a bus bar.

DETAILED DESCRIPTION

Figure 1:
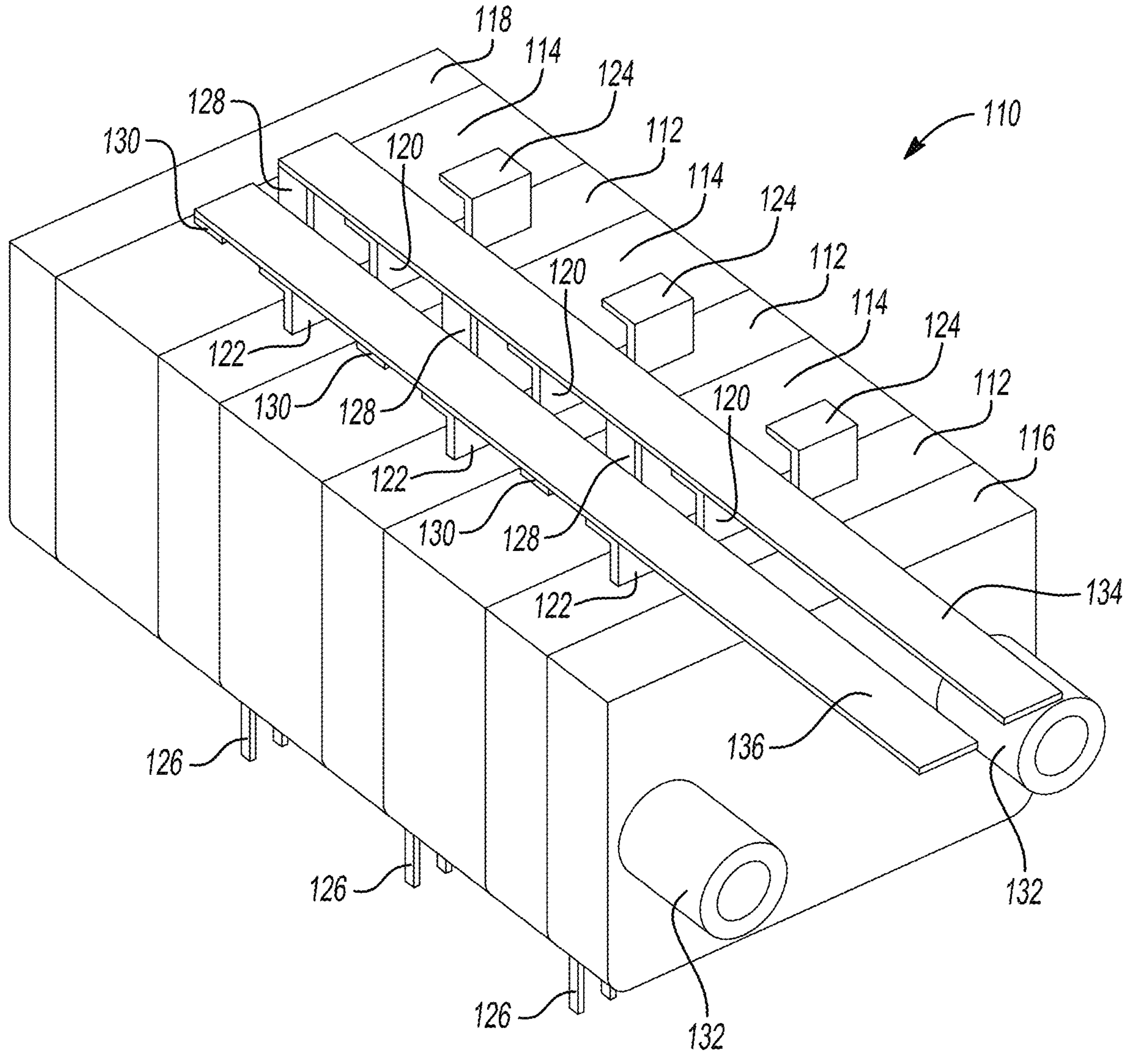
FIG. 1 is a perspective view of a typical power module assembly.

The following embodiments are described to illustrate the concepts and features of the invention. These embodiments are provided as examples, and other embodiments may exist in various alternative forms. The figures presented may not be to scale, and certain features may be exaggerated or minimized to emphasize specific components. Therefore, the specific structural and functional details disclosed are not meant to limit the scope of the invention but to serve as a representative basis for teaching those skilled in the art.

Various features illustrated and described with reference to any one of the figures may be combined with features from one or more other figures to produce different embodiments that are not explicitly shown or described. The combinations of features illustrated are intended to represent typical embodiments for common applications. However, different combinations and modifications of the features, consistent with the teachings of this disclosure, may be desired for specific applications or implementations.

Power modules can be integral to the functioning of EVs and HEVs, playing a role in managing and converting electrical energy within the powertrain. These modules incorporate multiple power semiconductor devices, such as insulated-gate bipolar transistors (IGBTs) and metal-oxide-semiconductor field-effect transistors (MOSFETs), along with passive components, sensors, and control circuitry into a single compact package. A function of power modules is to control and convert electrical power efficiently. They manage energy transfer between the battery, motor, and other electronic systems. Additionally, modern power modules may be designed to handle regenerative braking, where energy is recovered and fed back to the battery.

In a traction inverter, power modules and DC-link capacitors are typically connected through busbars during assembly. The power module converts DC power from the battery into AC power to drive the electric motor, while the DC-link capacitor stabilizes the DC voltage and filters out ripples caused by switching actions within the inverter. Busbars, which are conductive metal strips or bars, facilitate the electrical connection between the power module and the DC-link capacitor as mentioned above. The geometry of these busbars affects the parasitic inductances and heat transfer characteristics of the system. Parasitic inductance in the busbars can lead to voltage overshoots and increased electromagnetic interference (EMI), which can affect the performance of the traction inverter.

As mentioned above, power modules can include semiconductor devices like IGBTs and MOSFETs on power cards, which serve as the main switching elements. IGBTs are typically used in high voltage and high current applications due to their ability to accommodate substantial amounts of power, while MOSFETs are sometimes preferred for low voltage, high switching frequency applications. Gate drivers within the module drive the gates of these semiconductor devices. The modules and power cards therein may also contain passive components, such as capacitors, resistors, and inductors for filtering, energy storage, and noise reduction. Thermal management can be achieved through the use of heat sinks, liquid cooling systems, and thermal interface materials, which are designed to dissipate heat. In some systems, thermal management may also include phase-change materials or thermoelectric cooling to further enhance heat dissipation.

DC power terminal arrangements in the power module are often designed to manage high currents and voltages. These terminals typically connect to the battery via bus bars and are engineered to provide low-resistance, high-reliability connections. Materials such as copper or aluminum are commonly used for these terminals due to their electrical conductivity and thermal performance. These terminals may also be plated with materials like silver or gold to reduce oxidation and contact resistance.

Phase terminal arrangements, on the other hand, connect the power module to the electric machine, also via bus bars. These terminals are designed to handle the high-frequency switching and substantial current flow required to drive the motor efficiently. The phase terminals should be robust and capable of minimizing electrical resistance and thermal stress, which is why they are often constructed from high-conductivity materials such as copper or aluminum. Additionally, the design of these terminals often incorporates features to reduce electromagnetic interference (EMI) and parasitic inductance, which can affect the performance of the power module and the electric machine.

Control terminal arrangements connect to the vehicle's control unit and are responsible for transmitting control signals that regulate the operation of the power module. These signals include gate drive signals for the semiconductor switches (IGBTs or MOSFETs) and feedback signals for monitoring the module's performance. Control terminals are typically designed for lower power levels and are often insulated and shielded to prevent interference from the high-power sections of the module. Furthermore, these terminals may incorporate diagnostic features, such as overcurrent and over-temperature sensors. These diagnostic features enable real-time monitoring and protection of the power module.

DC connections between power card assemblies and between power card assemblies and DC-link capacitors are proposed using the terminals of the power module and eliminating the external DC busbars. The terminals of the power module may be designed to facilitate daisy-chain like electrical connections among the DC terminals. Various embodiments allow for different joining approaches such as laser-weld, press-fit, etc. Mating (joining) between terminals occurs on the DC-link capacitor in some interleaved designs.

Referring to FIG. 1, a typical power module assembly 110 includes a plurality of power card assemblies 112, a plurality of DC-link capacitor modules 114, and front and rear covers 116, 118. The power card assemblies 112 are interleaved with the DC-link capacitor modules 114. The front and rear covers 116, 118 are at opposite ends of the power module assembly 110. Each of the power card assemblies 112 includes, among other things, DC power lead tabs 120, 122, a phase lead tab 124, and control leads 126. Each of the DC-link capacitor modules includes, among other things, DC power lead tabs 128, 130. The front cover 116 includes cooling ports 132. The power module assembly 110 also includes bus bars 134, 136. The bus bar 134 is arranged across and connects the DC power lead tabs 120. The bus bar 136 is arranged across and connects the DC power lead tabs 122.

Figures 2A, 2B:
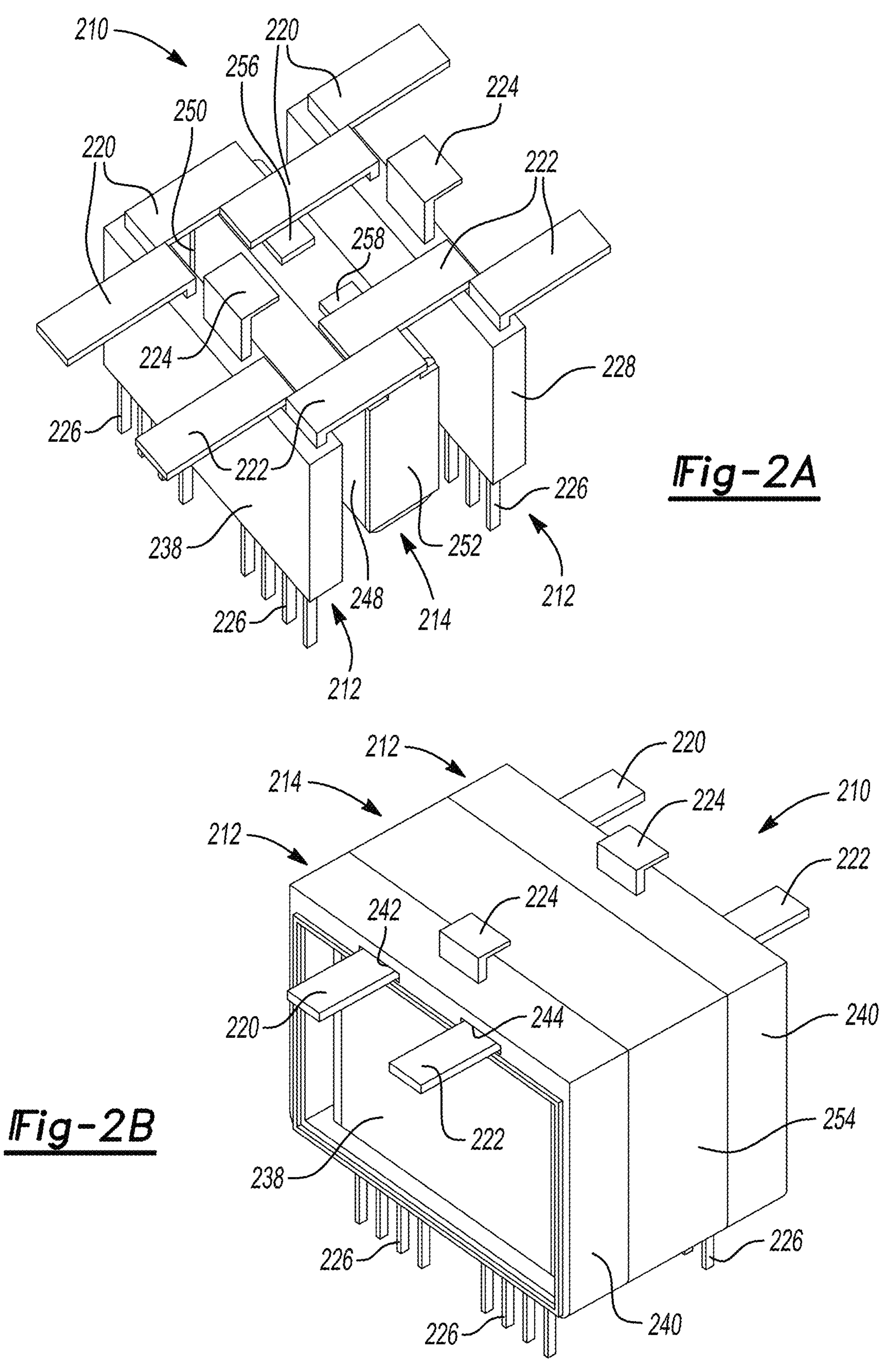
FIGS. 2A and 2B are perspective views of portions of a power module assembly with same side staggered daisy-chain power leads and phase leads.

Referring to FIGS. 2A and 2B, a power module assembly 210 includes a plurality of power card assemblies 212, and a plurality of DC-link capacitor modules 214 (of which one is shown). The power card assemblies 212 are interleaved with the DC-link capacitor modules 214.

Each of the power card assemblies 212 includes pairs of DC power lead tabs 220, 222, a phase lead tab 224, control leads 226, a power card 238, and a case 240 (e.g., an epoxy over mold). The case 240 defines slots 242, 244 on major faces thereof. The power card 238 is surrounded by the case 240, and the DC power lead tabs 220, 224, phase lead tab 224, and control leads 226 extend from minor faces of the power card 238. The DC power lead tabs 220, 224 extend through the slots 242, 244, respectively. In this configuration, the DC power lead tabs, 220, 224, and phase lead tab 224 are on a same side of the power card assembly 212, and the control leads 226 are on an opposite side. The DC power lead tabs 220 are bent in opposite directions at roughly 90° (forming an "L") such that they further extend away from opposite major faces of the power card 228. The DC power lead tabs 222 are similarly configured.

Each of the DC-link capacitor modules 214 includes a capacitive roll 248 (e.g., a polypropylene capacitive roll), lead tabs 250, 252, and a case 254. The lead tabs 250, 252 are in contact with the capacitive roll 248 on opposite sides thereof. The end of the lead tab 250 is bent around a side of the capacitive roll 248 to define a contact platform 256. Similarly, the end of the lead tab 252 is bent around a side of the capacitive roll 248 to define a contact platform 258. In this example, the contact platforms 256, 258 are on a same minor face of the DC-link capacitor module 214.

With a pair of the power card assemblies 212 on both sides of one of the DC-link capacitor modules 212, the DC power lead tabs 220 are bent such that one from each of the power card assemblies 212 is in face-to-face direct contact with the contact platform 256. Moreover, the ones of the DC power lead tabs 220 are in side-to-side direct contact with each other to define a staggered pattern-eliminating the need for bus bars to facilitate DC power lead connection. The DC power lead tabs 222 and similarly configured and arranged with the contact platform 258. The contacts between the terminal surfaces can be ensured by normal forces caused by tight fit of power module terminals into the slots 242, 244.

Figure 3:
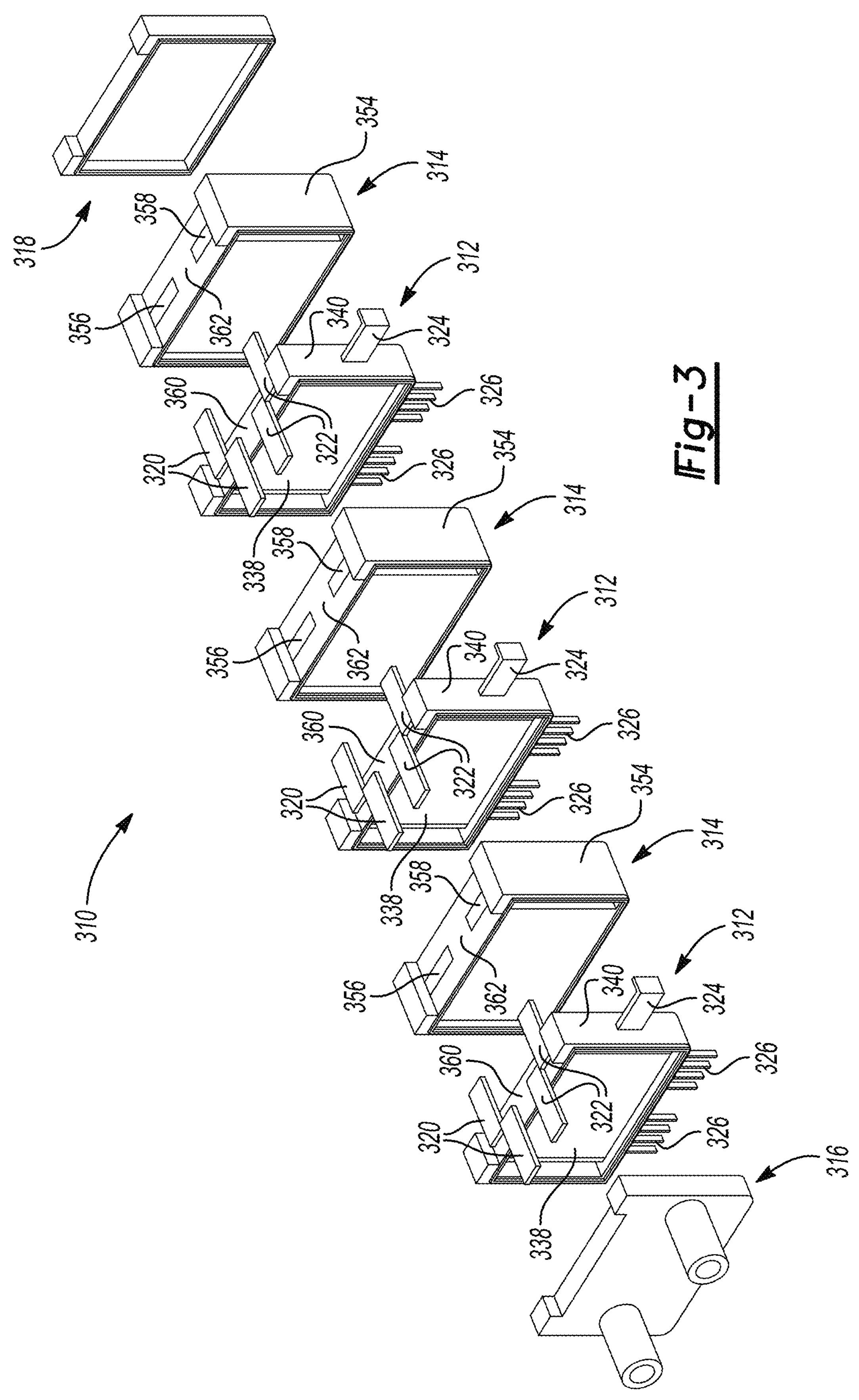
FIG. 3 is an exploded perspective view of a power module assembly with same side staggered daisy-chain power leads and adjacent side phase leads.

Referring to FIG. 3, a power module assembly 310 includes a plurality of power card assemblies 312, and a plurality of DC-link capacitor modules 314. Each of the power card assemblies 312 includes pairs of DC power lead tabs 320, 322, a phase lead tab 324, control leads 326, a power card 338, and a case 340. Each of the DC-link capacitor modules 314 includes a case 354 and contact platforms 356, 358. Like reference numbers have similar descriptions to that of FIGS. 2A and 2B. For the sake of brevity, descriptions of similar subject matter between the examples will not be repeated. Certain differences, however, will be noted.

The cases 340, 354 have recessed portions 360, 362, respectively. The recessed portions 360 are on a same side as the DC power lead tabs 320, 322. The recessed portions 362 are on a same side as the contact platforms 356, 358. The recessed portions 360, 362 accommodate arrangement of the DC power lead tabs 320, 322. The exposed DC power lead tabs 320, 322 allow joining techniques such as laser welding to connect the same with that of the DC-link capacitor modules 314. The raised profile adjacent to the recessed portions 360, 362 can be used for mounting the power module assembly 310 into an inverter system controller housing and provide electrical isolation from the housing surface. The cavity formed by the recessed portions 360, 362 can be filled with thermally conductive or phase change materials to promote heat transfer from the DC power lead tabs 320, 322.

The DC power lead tabs 320, 322 and the phase lead tabs 324 are on different sides of the power module assembly 310.

Figure 4:
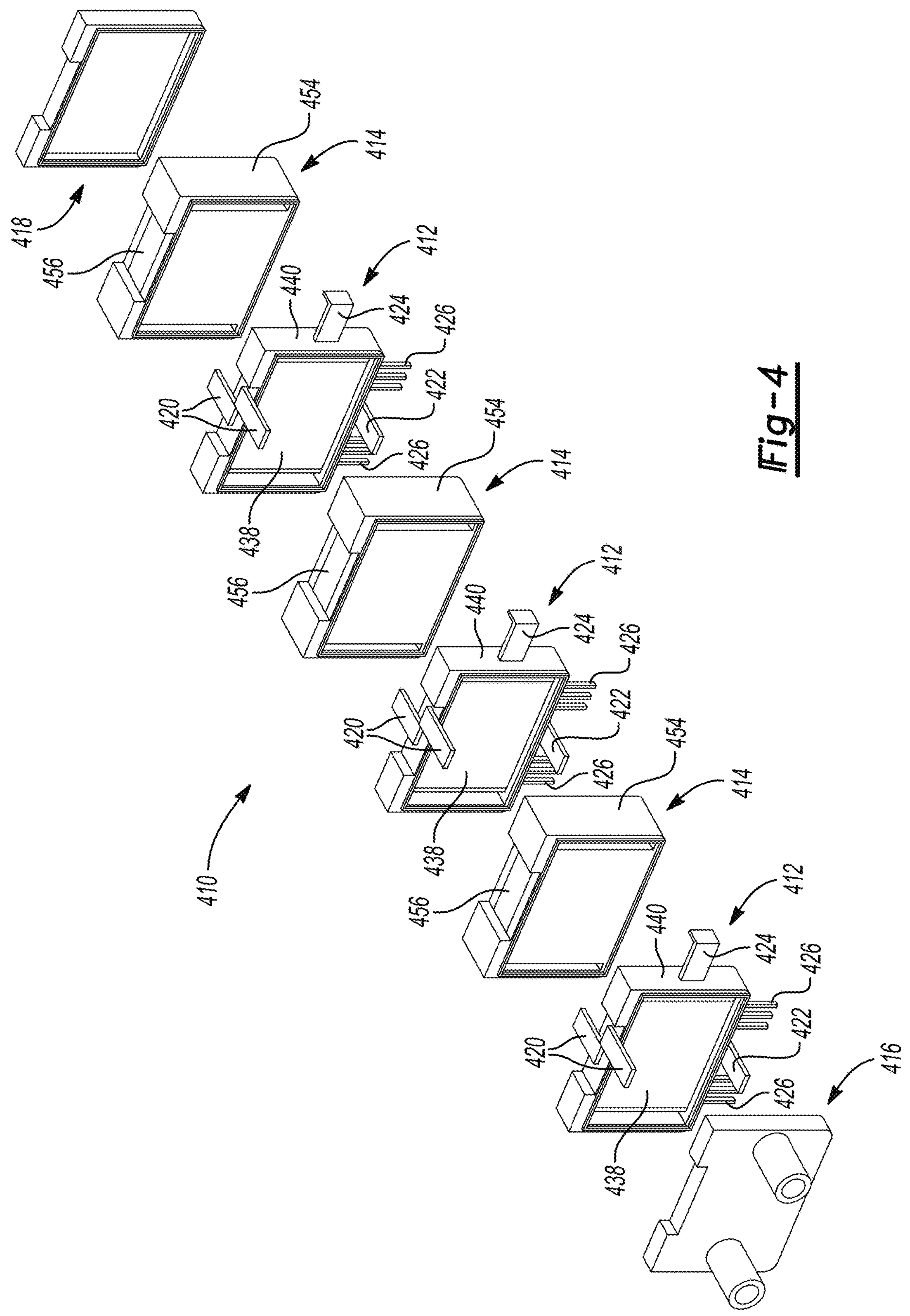
FIG. 4 is an exploded perspective view of a power module assembly with opposite side staggered daisy-chain power leads and adjacent side phase leads.

Referring to FIG. 4, a power module assembly 410 includes a plurality of power card assemblies 412, and a plurality of DC-link capacitor modules 414. Each of the power card assemblies 412 includes pairs of DC power lead tabs 420, 422, a phase lead tab 424, control leads 426, a power card 438, and a case 440. Each of the DC-link capacitor modules 414 includes a case 454 and contact platforms, including contact platforms 456. Like reference numbers have similar descriptions to that of FIGS. 2A, 2B, and 3.

The DC power lead tabs 420 and the DC power lead tabs 422 are on opposite sides of the power module assembly 410. The contact platforms 456 and the contact platforms (not shown) associated with the DC power lead tabs 422 are on opposite sides of the DC-link capacitor modules 414.

Figures 5A, 5B:
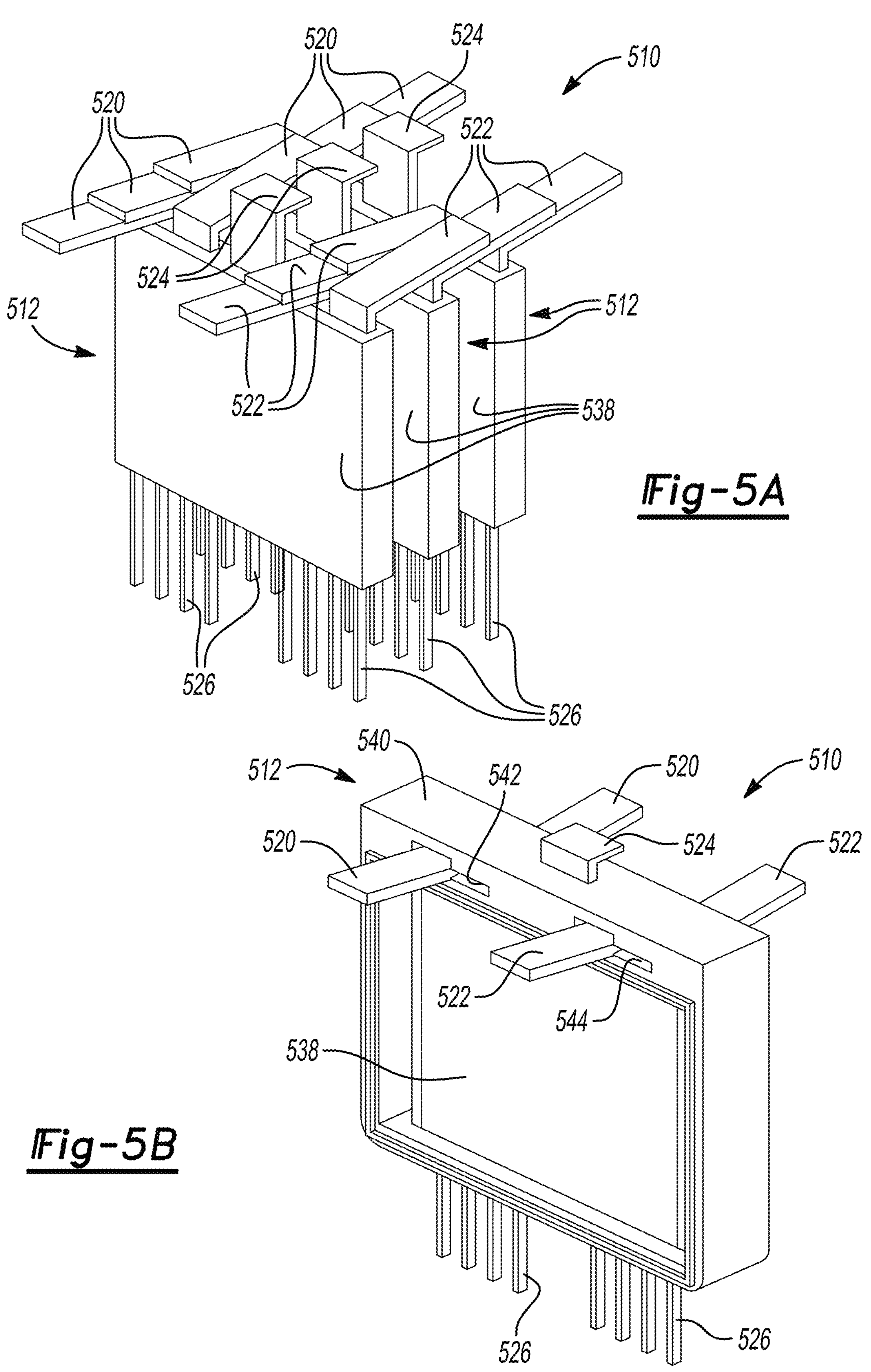
FIGS. 5A and 5B are perspective views of portions of a power module assembly with same side cascaded daisy-chain power leads and phase leads.

Referring to FIGS. 5A and 5B, a power module assembly 510 includes a plurality of power card assemblies 512. Each of the power card assemblies 512 includes pairs of DC power lead tabs 520, 522, a phase lead tab 524, control leads 526, a power card 538, and a case 540. The case 540 defines slots 542, 544. Like reference numbers have similar descriptions to that of FIGS. 2A, 2B, 3, and 4.

The DC power lead tabs 520 are bent in opposite directions such that ones of the DC power lead tabs 520 bent in the same direction are folded onto one another and contact each other in face-to-face manner. The DC power lead tabs 522 are similarly configured.

Figures 6A, 6B:
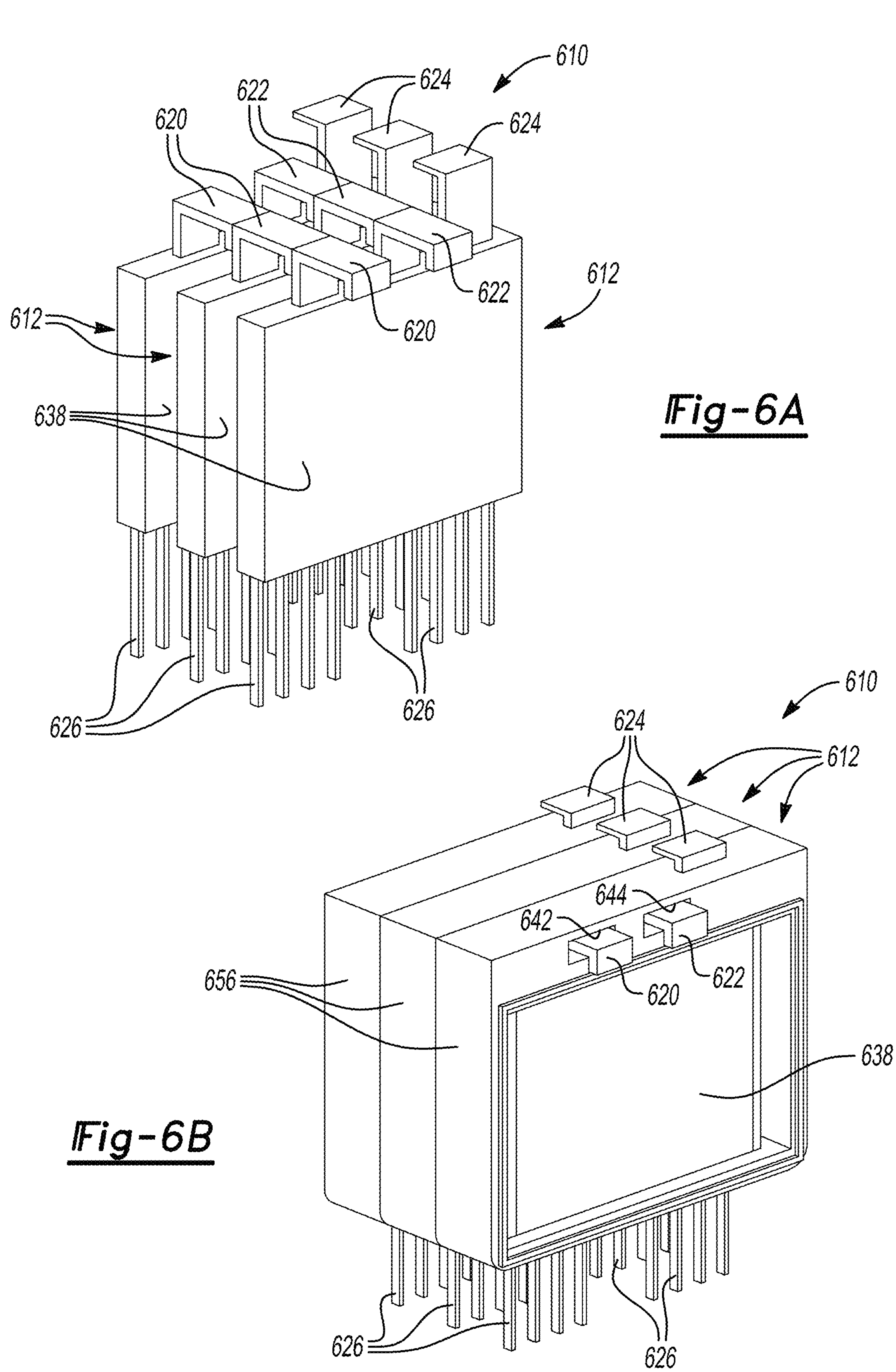
FIGS. 6A and 6B are perspective views of portions of a power module assembly with same side stepwise daisy-chain power leads and phase leads.

Referring to FIGS. 6A and 6B, a power module assembly 610 includes a plurality of power card assemblies 612. Each of the power card assemblies 612 includes DC power lead tabs 620, 622, a phase lead tab 624, control leads 626, a power card 638, and a case 640. The case 640 defines slots 642, 644. Like reference numbers have similar descriptions to that of FIGS. 2A, 2B, 3, 4, and 5.

The DC power lead tabs 620 are each bent to form a U-like shape such that (with reference to the orientation of FIG. 6A), an end vertical portion of one of the DC power lead tabs 620 is in direct contact with a base vertical portion of another of the DC power lead tabs 620. The DC power lead tabs 622 are similarly configured.

Although exemplary embodiments have been described above, they are not intended to encompass all possible forms covered by the claims. The terminology used in this specification serves to describe the embodiments rather than to limit them, and it is understood that various modifications and changes can be made without departing from the spirit and scope of the disclosed materials.

While certain embodiments may have been described as offering advantages or being preferred over others or prior art implementations with respect to specific characteristics, those skilled in the art understand that one or more features or characteristics might be adjusted or compromised to achieve desired overall system attributes, depending on the specific application and implementation. These attributes may include, but are not limited to, strength, durability, marketability, appearance, packaging, size, serviceability, weight, manufacturability, and ease of assembly. Therefore, embodiments that may be less desirable than others or prior art implementations concerning certain characteristics are still within the scope of the disclosure and may be advantageous for particular applications.

What is claimed is:

1. An automotive power electronics system comprising:

a plurality of capacitor modules each including a capacitive roll and lead tabs, in contact with the capacitive roll, that define contact platforms on at least one face of the capacitor module; and a plurality of power card assemblies interleaved with the capacitor modules, each of the power card assemblies including a power card, a phase lead tab extending from the power card, and pairs of power lead tabs extending from the power card and being bent such that each of the power lead tabs is in direct contact with one of the contact platforms and one of the power lead tabs of another of the power card assemblies.

2. The automotive power electronics system of claim 1, wherein the power lead tabs define staggered patterns.

3. The automotive power electronics system of claim 1, wherein each of the power lead tabs is in direct side-to-side contact with one of the power lead tabs of another of the power card assemblies.

4. The automotive power electronics system of claim 1, wherein the phase lead tab and power lead tabs extend from a same side of the power card.

5. The automotive power electronics system of claim 1, wherein the pairs of power lead tabs extend from opposite sides of the power card assembly.

6. The automotive power electronics system of claim 1, wherein each of the power card assemblies further includes a case defining slots configured to accommodate the power lead tabs passing therethrough.

7. The automotive power electronics system of claim 1, wherein each of the power card assemblies further includes a case surrounding the power card.

8. The automotive power electronics system of claim 1, wherein the at least one face is a minor face.

9. The automotive power electronics system of claim 1, wherein each of the power card assemblies further includes control leads extending from the power card.

10. An automotive power module comprising:

a plurality of power card assemblies arranged in a stack, each of the power card assemblies including a power card, a phase lead tab extending from the power card, and at least one pair of power lead tabs extending from the power card and being bent such that one of the power lead tabs is in direct contact with one of the power lead tabs of another of the power card assemblies.

11. The automotive power module of claim 10, wherein the at least one pair is bent such that the one of the power lead tabs is folded onto the one of the power lead tabs of the another of the power card assemblies in a face-to-face configuration.

12. The automotive power module of claim 10, wherein the power lead tabs define cascaded patterns.

13. The automotive power module of claim 10, wherein the at least one pair is bent such that the one of the power lead tabs and the one of the power lead tabs of the another of the power card assemblies are in side-to-side contact.

14. The automotive power module of claim 10, wherein the power lead tabs define staggered patterns.

15. The automotive power module of claim 10, wherein the power lead tabs are U-shaped and define stepwise patterns.

16. The automotive power module of claim 10, wherein each of the power card assemblies further includes a case defining slots configured to accommodate the power lead tabs passing therethrough.

17. The automotive power module of claim 10, wherein each of the power card assemblies further includes a case surrounding the power card.

18. The automotive power module of claim 10, wherein each of the power card assemblies further includes control leads extending from the power card.

19. An automotive power module comprising:

a plurality of power card assemblies arranged in a stack, each of the power card assemblies including a power card, a phase lead tab extending from the power card, and pairs of power lead tabs extending from the power card and being in direct contact with at least some of the phase lead tabs of adjacent ones of the power card assemblies without use of a bus bar.

20. The automotive power module of claim 19, wherein the power card assemblies are in direct contact with each other.

* * * * *